United States Patent
Dong

(10) Patent No.: US 11,050,667 B2
(45) Date of Patent: Jun. 29, 2021

(54) PACKET FORWARDING METHOD, DEVICE, SWITCH, APPARATUS, AND STORAGE MEDIUM

(71) Applicants: Beijing Kingsoft Cloud Network Technology Co., Ltd., Beijing (CN); Beijing Kingsoft Cloud Technology Co., Ltd., Beijing (CN)

(72) Inventor: Bin Dong, Beijing (CN)

(73) Assignees: BEIJING KINGSOFT CLOUD NETWORK TECHNOLOGY CO., LTD., Beijing (CN); BEIJING KINGSOFT CLOUD TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/651,682

(22) PCT Filed: Sep. 28, 2018

(86) PCT No.: PCT/CN2018/108281
§ 371 (c)(1),
(2) Date: Mar. 27, 2020

(87) PCT Pub. No.: WO2019/062839
PCT Pub. Date: Apr. 4, 2019

(65) Prior Publication Data
US 2020/0267082 A1    Aug. 20, 2020

(30) Foreign Application Priority Data
Sep. 28, 2017 (CN) .......... 201710897731.4

(51) Int. Cl.
*H04L 29/08* (2006.01)
*H04L 12/743* (2013.01)
(Continued)

(52) U.S. Cl.
CPC ...... *H04L 45/7453* (2013.01); *G06F 16/9024* (2019.01); *H04L 45/02* (2013.01);
(Continued)

(58) Field of Classification Search
None
See application file for complete search history.

(56) References Cited

U.S. PATENT DOCUMENTS 7,609,687 B2    10/2009  Kobayashi et al.
2010/0306596 A1*  12/2010  Kawachiya ......... G06F 11/3672
                                                                714/45
(Continued)

FOREIGN PATENT DOCUMENTS

CN        1708755 A    12/2005
CN      102882793 A     1/2013
(Continued)

OTHER PUBLICATIONS

Decision to Grant from RU application No. 2020114474, dated Aug. 10, 2020, all pages cited in its entirety.
(Continued)

Primary Examiner — Ajit Patel
(74) Attorney, Agent, or Firm — Burr & Forman, LLP

(57) ABSTRACT

A method, apparatus, switch, device for packet forwarding and storage medium are disclosed. The method includes: obtaining a packet to be forwarded; detecting whether a first data table contains connection cache information corresponding to the packet; obtaining a first identifier of the connection cache information from the first data table if the first data table contains the connection cache information corresponding to the packet; obtaining connection information corresponding to the connection cache information from a second data table, and determining a second identifier of the connection cache information, wherein the second iden-
(Continued)

tifier is a current connection identifier corresponding to the connection cache information and changes when the connection information changes; and forwarding the packet based on the connection cache information if the second identifier is the same as the first identifier. The method for packet forwarding according an embodiment of the present application can reduce errors in packet forwarding.

16 Claims, 5 Drawing Sheets

(51) Int. Cl.
  *G06F 16/901* (2019.01)
  *H04L 12/751* (2013.01)
  *H04L 12/721* (2013.01)
  *H04L 12/747* (2013.01)
  *H04L 29/12* (2006.01)
  *H04L 29/06* (2006.01)
(52) U.S. Cl.
  CPC ............ *H04L 45/38* (2013.01); *H04L 45/742* (2013.01); *H04L 61/6022* (2013.01); *H04L 63/20* (2013.01)

(56) References Cited

U.S. PATENT DOCUMENTS

| | | | |
|---|---|---|---|
| 2013/0325317 A1 | 12/2013 | Pylappan et al. | |
| 2014/0233384 A1 | 8/2014 | Howard | |
| 2014/0244851 A1* | 8/2014 | Lee | H04L 12/4641 709/228 |
| 2015/0244612 A1* | 8/2015 | Yamasaki | H04L 67/1097 370/225 |
| 2016/0142306 A1 | 5/2016 | Shimokuni et al. | |
| 2018/0262599 A1* | 9/2018 | Firestone | G06F 9/45558 |
| 2018/0367459 A1* | 12/2018 | Chandrasekaran | H04L 45/02 |
| 2019/0028475 A1* | 1/2019 | Back | H04L 47/20 |
| 2019/0158401 A1* | 5/2019 | Liang | H04L 49/30 |

FOREIGN PATENT DOCUMENTS

| | | |
|---|---|---|
| CN | 103139752 A | 6/2013 |
| CN | 103428090 A | 12/2013 |
| CN | 104363174 A | 2/2015 |
| CN | 105553841 A | 5/2016 |
| CN | 106131919 A | 11/2016 |
| CN | 106603401 A | 4/2017 |
| CN | 106993036 A | 7/2017 |
| KR | 101346407 B1 | 1/2014 |
| RU | 2189072 C2 | 9/2002 |
| RU | 2343640 C2 | 1/2009 |

OTHER PUBLICATIONS

Office Action from CN application No. 201710897731.4 dated Jul. 2, 2020, all pages cited in its entirety.

* cited by examiner

PACKET FORWARDING METHOD, DEVICE, SWITCH, APPARATUS, AND STORAGE MEDIUM

The present application claims the priority to a Chinese patent application No. 201710897731.4, filed with the China National Intellectual Property Administration on Sep. 28, 2017 and entitled "Packet Forwarding Method, Device, Switch, Apparatus and Storage Medium", which is incorporated herein by reference in its entirety.

TECHNICAL FIELD

The present application relates to the field of Internet technologies, and in particular to a method, an apparatus, a switch, a device for forwarding packets and a storage medium.

BACKGROUND

A vSwitch (Virtual Switch) is a virtual device running on a compute node or host in a public cloud, it is a software program that emulates a physical switch as a layer-2 or layer-3 network device. In the prior art, when forwarding a packet, order to speed up the forwarding of a packet, after a communication connection is established between the node sending the packet and the node receiving the packet, connection information for the packet is saved to a quick table. When another packet is to be communicated between the node sending the packet and the node receiving the packet, fast forwarding of the packet can be performed by directly searching for the connection information in the quick table.

However, in existing technologies that use virtual switches to forward packets, when the connection status of a device associated with the connection information is changed or the configuration of the control plane is changed, the connection information will become invalid. Thus, forwarding a packet according to the expired connection information will cause errors in the forwarding of the packet.

SUMMARY

The purpose of the embodiments of the present application is to provide a method, an apparatus, a switch, a device for packet forwarding and a storage medium, to reduce errors in packet forwarding. The specific technical solutions are described below.

In the first aspect, an embodiment of the present application provides a method for packet forwarding, applicable to a switch, including: obtaining a packet to be forwarded; detecting whether a first data table contains connection cache information corresponding to the packet; obtaining a first identifier of the connection cache information from the first data table if the first data table contains the connection cache information corresponding to the packet, wherein the first identifier is a connection identifier corresponding to the connection cache information when the connection cache information is established; obtaining connection information corresponding to the connection cache information from a second data table, and determining a second identifier of the connection cache information according to the connection information corresponding to the connection cache information, wherein the second identifier is a current connection identifier corresponding to the connection cache information and changes when the connection information changes; and forwarding the packet based on the connection cache information if the second identifier is the same as the first identifier.

In the second aspect, an embodiment of the present application provides a method for packet forwarding, applicable to a packet sending/device, including: monitoring connection information for connecting to a current network, and updating a connection identifier according to a preset update rule when the connection information is changed; and sending the connection identifier updated to a switch to cause the switch to update a second data table with the connection identifier updated.

In the third aspect, an embodiment of the present application provides an apparatus for packet forwarding, applicable to a switch, including: a packet obtaining module, configured for obtaining a packet to be forwarded; a detecting module, configured for detecting whether a first data table contains connection cache information corresponding to the packet; a first-identifier obtaining module, configured for obtaining a first identifier of the connection cache information from the first data table if the first data table contains the connection cache information corresponding to the packet, wherein the first identifier is a connection identifier corresponding to the connection cache information when the connection cache information is established; a second-identifier determination module, configured for obtaining connection information corresponding to the connection cache information from a second data table, and determining a second identifier of the connection cache information according to the connection information corresponding to the connection cache information, wherein the second identifier is a current connection identifier corresponding to the connection cache information and changes when the connection information changes; and a first packet forwarding module, configured for forwarding the packet based on the connection cache information if the second identifier is the same as the first identifier.

In the fourth aspect, an embodiment of the present application provides an apparatus for packet forwarding, applicable to a packet sending/receiving device, including: a connection information monitoring module, configured for monitoring connection information for connecting to a current network, and updating a connection identifier according to a preset update rule when the connection information is changed; and a connection identifier sending module, configured for sending the connection identifier updated to a switch to cause the switch to update a second data table with the connection identifier updated.

In the fifth aspect, an embodiment of the present application provides a switch, including a processor and a machine-readable storage medium, wherein the machine-readable storage medium comprises machine-executable instructions that, when executed by the processor, cause the processor to carry out any method according to the first aspect.

In the sixth aspect, an embodiment of the present application provides a packet sending/receiving device, including a processor and a machine-readable storage medium, wherein the machine-readable storage medium comprises machine-executable instructions that, when executed by the processor, cause the processor to carry out any method according to the second aspect.

In the seventh aspect, an embodiment of the present application provides a computer-readable storage medium having stored thereon a computer program which, when executed by a processor, causes the processor to carry out any method according to the first aspect.

In the eighth aspect, an embodiment of the present application provides a computer-readable storage medium having stored thereon a computer program which, when executed by a processor, causes the processor to carry out the method according to the second aspect.

In the ninth aspect, an embodiment of the present application provides a computer program product including instructions which, when executed on a computer, causes the computer to perform any method according to the first aspect.

In the tenth aspect, an embodiment of the present application provides a computer program product including instructions which, when executed on a computer, causes the computer to perform the method according to the second aspect.

In the eleventh aspect, an embodiment of the present application provides a computer program that, when executed on a computer, causes the computer to perform any method according to the first aspect.

In the twelfth aspect, an embodiment of the present application provides a computer program that, when executed on a computer, causes the computer to perform the method according to the second aspect.

Embodiments of a method, an apparatus, a switch, a device for packet forwarding and a storage medium are provided. In the method for packet forwarding, A packet to be forwarded is obtained. It is detects whether a first data table contains connection cache information corresponding to the packet to be forwarded. If the first data table contains the connection cache information corresponding to the packet to be forwarded, the first identifier of the connection cache information is obtained from the first data table, wherein the first identifier is a connection identifier corresponding to the connection cache information when the connection cache information is established. Connection information corresponding to the connection cache information from a second data table is obtained, and a second identifier of the connection cache information is determined according to the connection information corresponding to the connection cache information, wherein the second identifier is a current connection identifier corresponding to the connection cache information and changes when the connection information changes. If the second identifier is same as the first identifier, the packet to be forwarded is forwarded according to the connection cache information. If the first identifier and the second identifier of the connection cache information are the same, it indicates that the connection cache information has not become invalid. Thus, the packet is forwarded according to the connection cache information, which can reduce errors in packet forwarding. Certainly, it is not necessary for any product or method according to the present application to achieve all the above advantageous at the same time.

BRIEF DESCRIPTION OF THE DRAWINGS

In order to more clearly describe the technical solution of the embodiments of the application and the prior art, drawings used in the embodiments and the prior art will be briefly described below. Obviously, the drawings described below are for only some embodiments of the present application, one of ordinary skills in the art can also obtain other drawings based on the drawings herein without any creative efforts.

DETAILED DESCRIPTION

In order to make objectives, technical solutions and advantages of the present application more apparent, details of the present application will be described with reference to the accompanying drawings and by way of examples. Obviously, the embodiments described are only some of the embodiments of the present application instead of all of them. All other embodiments obtained by those of ordinary skills in the art based on the embodiments herein without any creative efforts are within the scope of the present application.

Figure 1:
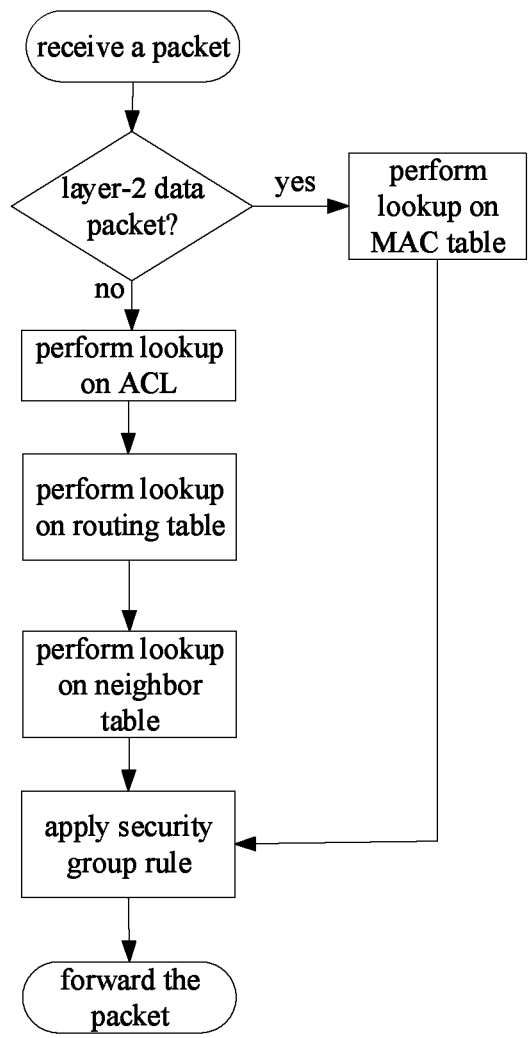
FIG. 1 is a schematic flowchart of forwarding a packet by a switch in the prior art.

Referring to FIG. 1, a schematic flowchart of forwarding a packet by a switch in the prior art is shown. When a switch receives a packet, it determines whether the destination address of the packet is in the same network segment as the address of the switch, that is, whether the packet is a layer-2 data packet. If the destination address of the packet and the address of the switch are in the same network segment, i.e., the packet is a layer-2 data packet, the switch searches a MAC table and applies security group rules are matched and then forwards the packet. If the destination address of the packet and the address of the switch are not in the same network segment, i.e., the packet is not a layer-2 data packet, the switch will search an ACL, a routing table and a neighbor table, etc., and apply the security group rules, and then forward the packet. In the prior art, when a device, such as a virtual machine, communicates with another virtual machine, in particular another virtual machine for east-west traffic, multiple forwarding tables have to be searched, which will cause a significant degradation in performance of packet forwarding.

In order to speed up the packet forwarding, after a packet is forwarded for the first time, that is, after a communication connection is established between the packet sending node and the packet receiving node, path information for the packet is saved to a quick table. When the packet sending node communicates with the packet receiving node again, a packet will be forwarded directly based on the path information in the quick table. However, when connection status of a device or the configuration of the control plane involved in the path information is changed, the path information will be invalid. Forwarding packets according to the invalid path information will cause an error, and it takes a lot of time to traverse all path information in the quick table to remove the invalid path information, especially when there is a large amount of connection information in the quick table. This seriously affects the packet forwarding speed and results in a low efficiency of the packet forwarding.

Based on common layer-4 protocols such as TCP (Transmission Control Protocol) or UDP (User Datagram Protocol), etc., for stateful firewalls such as security groups, etc., a connection entry has to be established based on five-tuple information, so as to guarantee that returned packets can be allowed even if they do not conform to the security group rules. Embodiments of the present application intend to cache entry information of packet forwarding based on a connection, so as to reduce the time for searching the table to forward a packet on the basis of the connection that has been established between the device sending the packet and the device receiving the packet (data packet), and to reduce the several searches on the table in the conventional process to one search and then quickly forward the packet. This achieves a fast transmission for a virtual switch, avoids errors caused by forwarding a packet according to invalid connection information.

Figure 2:
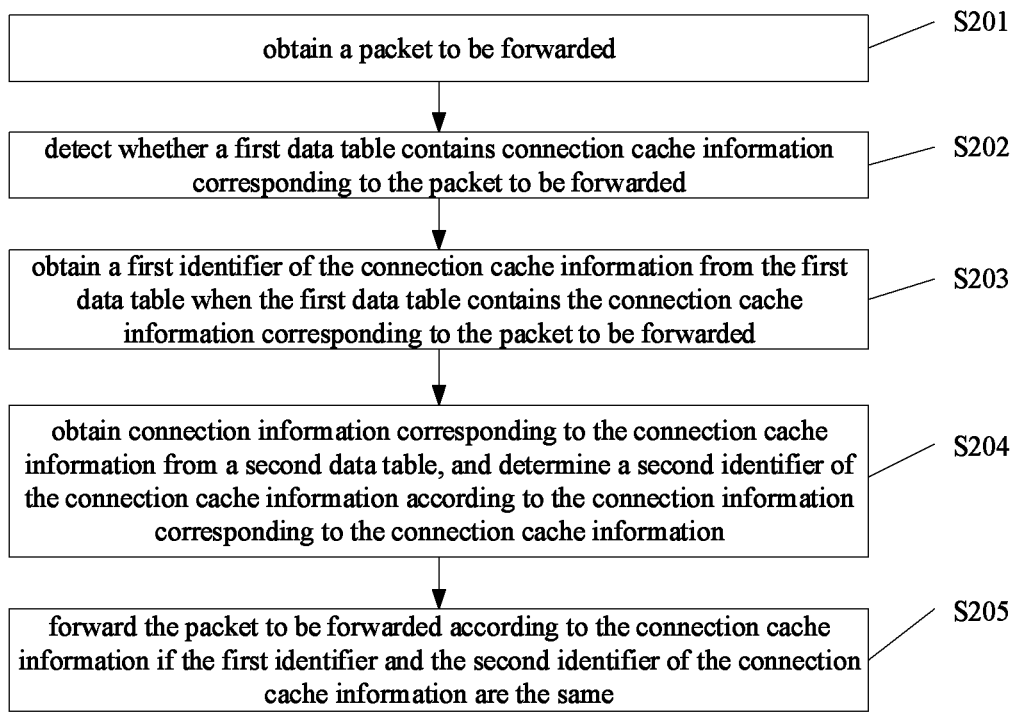
FIG. 2 is a schematic flowchart of a method for packet forwarding according to an embodiment of the present application, which is applicable to a switch.

Referring to FIG. 2, an embodiment of a method for packet forwarding is provided, which is applicable to a switch. The method includes steps S201-S205.

At step S201, a packet to be forwarded is obtained.

The method for packet forwarding according to the embodiment of the present application is applicable to a switch, which may be a physical switch or a virtual switch. A virtual switch is used as an example. Here, the virtual switch receives/obtains the packet to be forwarded sent by a packet sending/receiving device.

At step S202, it detects whether a first data table contains connection cache information corresponding to the packet to be forwarded.

The first data table is used to record connection cache information of two packet sending/receiving devices, between which a connection has been established, and a first identifier of the connection cache information.

The connection cache information corresponding to the packet includes a transmission path of the packet, and may also include identifiers of packet sending/receiving devices on the transmission path, such as an ID (Identification) or IP address, etc. When the first data table contains connection cache information having a transmission path that includes identifiers of a packet sending device and a packet receiving device same as the identifiers of the sending device and the receiving device in the packet to be forwarded, the connection cache information is used as the connection cache information corresponding to the packet to be forwarded, and it is determined that the first data table contains the connection cache information corresponding to the packet to be forwarded.

For example, the IP addresses of a packet sending device and a packet receiving device contained in a first packet to be forwarded are 13 and 25 respectively. The first data table is searched, and it detects that the first data table contains first connection cache information that has a transmission path, and IP addresses of a packet sending device and a packet receiving device on the transmission path are 13 and 25 respectively. Thus, it is determined that the first data table contains the connection cache information corresponding to the first packet to be forwarded, which is the first connection cache information.

Optionally, the first data table records a five-tuple for connection cache information. If there is a five-tuple in the first data table which is the same as the five-tuple of the packet to be forwarded, it is determined that the first data table contains the connection cache information corresponding to the packet to be forwarded. The connection cache information corresponding to the five-tuple in the first data table which is the same as the five-tuple of the packet to be forwarded is used as the connection cache information corresponding to the packet to be forwarded. A five-tuple includes a source IP address, a source port, a destination IP address, a destination port, and a transport layer protocol. Using the five-tuple to determine the connection cache information corresponding to the packet to be forwarded can achieve a more accurate determination result.

At step S203, if the first data table contains the connection cache information corresponding to the packet to be forwarded, the first identifier of the connection cache information is obtained from the first data table, wherein the first identifier is a connection identifier corresponding to the connection cache information when the connection cache information is established.

The device in the embodiment of the present application is specifically a packet sending/receiving device, which may be a physical device or a virtual device. The connection cache information contains the identifier of each packet sending/receiving device on the transmission path. A device corresponding to the identifier included in the connection cache information is used as a device corresponding to the connection cache information. The first data table records the first identifier of the connection cache information. The first identifier is a connection identifier corresponding to the connection cache information, which is recorded when the connection cache information is established. The first identifier of the connection cache information may be first identifiers of packet sending/receiving devices corresponding to the connection cache information. For example, when the connection cache information is written into the first data table, devices (packet sending/receiving devices) corresponding to the connection cache information are device 1, device 2 and device 3, the connection identifier of the device 1 is 7, the connection identifier of the device 2 is 6, and the connection identifier of the device 3 is 9. Thus, the first identifier of the connection cache information may be 7, 6, 9.

In a public cloud, VPCs (Virtual Private Cloud, private network) support multiple users to share the public cloud, and each user has a VXLAN (Virtual Extensible LAN) identifier, such as a VXLAN ID, to isolate the users from each other. For each user, an independent data structure is stored on a virtual switch to record connection cache information on the layer-2 network and layer-3 network. Therefore, the first identifier of the connection cache information may also be a first identifier of each user corresponding to the connection cache information. For example, when the connection cache information is written into the first data table, users corresponding to the connection cache information are user 1 and user 2, and user 1 has a connection identifier of 1 and user 2 has a connection identifier of 8, and thus the first identifier of the connection cache information may be 1, 8.

At step S204, connection information corresponding to the connection cache information from a second data table is obtained, and a second identifier of the connection cache information is determined according to the connection information corresponding to the connection cache information, wherein the second identifier is a current connection identifier corresponding to the connection cache information and changes when the connection information changes.

The second identifier is the current connection identifier of the connection cache information. When the connection information corresponding to the connection cache information is changed, the current connection identifier of the connection cache information is correspondingly changed according to a preset change rule. The second data table records the connection information corresponding to the connection cache information. The connection information corresponding to the connection cache information may be connection identifiers of packet sending/receiving devices corresponding to the connection cache information, or may be connection identifiers of users corresponding to the connection cache information. The second identifier of the connection cache information is the current connection identifier of the connection cache information. When the connection information corresponding to the connection cache information is changed, the second identifier of the connection cache information changes according to the preset change rule correspondingly. The preset change rule may be any rule that can realize the change of the second identifier.

For example, devices (packet sending/receiving devices) corresponding to the connection cache information are device 1, device 2, device 3 and device 4. The device 1 has a connection identifier of 11, the device 2 has a connection identifier of 11, the device 3 has a connection identifier of 9, and the device 4 has a connection identifier of 13. It is thus determined that the second identifier of the connection cache information currently is 11, 11, 9, 13. If the connection information of the device 2 is changed and the connection identifier of the device 2 is updated to 12, the second identifier of the connection cache information is correspondingly changed to 11, 12, 9, 13.

For example, users corresponding to the connection cache information are user 1 and user 2. The user 1 has a connection identifier of 6, and the user 2 has a connection identifier of 13. It is thus determined that the second identifier of the connection cache information currently is 6, 13. If the connection information of the user 1 is changed and the connection identifier of the user 1 is updated to 7, the second identifier of the connection cache information is correspondingly changed to 7, 13.

At step S205, if the second identifier is same as the first identifier, the packet to be forwarded is forwarded according to the connection cache information.

For example, the first identifier of the connection cache information is 11, 9, 13; and the second identifier of the connection cache information is 11, 9, 13. The first identifier and the second identifier of the connection cache information are the same, and the packet to be forwarded is then forwarded according to the transmission path in the connection cache information.

In the embodiment of the present application, if the second identifier is the same as the first identifier, it means that the connection cache information is not invalid. The packet to be forwarded is forwarded according to the connection cache information, which achieves a fast path for forwarding of the packet to be forwarded, avoids the failure of forwarding the packet, and achieves high efficiency of packet forwarding.

The switch stores two data tables, i.e., the first data table and the second data table.

The first data table is used to record connection cache information. The connection cache information is established when two packet sending/receiving devices communicate for the first time. The connection cache information contains the path for transmitting the packet between the packet sending/receiving devices and the first identifier of the connection cache information. The first identifier characterizes the connection information of each device on the packet transmission path. For example, there are three devices on the packet transmission path, i.e. device 1, device 2 and device 3. When a communication connection is established, the connection identifier corresponding to the connection information of the device 1 is 7, the connection identifier corresponding to the connection information of the device 2 is 6, and the connection identifier corresponding to the connection information of the device 3 is 9. Thus, the first identifier of the connection cache information is 7, 6, 9.

The second data table records the connection information of each packet sending/receiving device. The connection information is real-time connection information of the packet sending/receiving device (When the connection information of the packet sending/receiving device is changed, the packet sending/receiving device actively reports the changed connection information).

When a packet is to be forwarded, the switch obtains connection cache information corresponding to the packet from the first data table (the connection cache information is determined according to the packet sending device and the packet receiving device for the packet. If the first data table does not contain the connection cache information, the switch will operate according to the process shown in FIG. 1), and obtains the first identifier of the connection cache information corresponding to the packet. The switch obtains connection information corresponding to the connection cache information corresponding to the packet from the second data table (i.e., the connection information of each device on the packet transmission path recorded in the connection cache information), and determines the second identifier of the connection cache information according to the connection information.

If the second identifier is the same as the first identifier, it means that the connection cache information is not invalid. Thus, the packet to be forwarded is forwarded according to the connection cache information, which achieves the fast forwarding of the packet to be forwarded, and avoids the failure in forwarding the packet. If the second identifier is different from the first identifier, it means that the connection cache information is invalid. Thus, it is necessary to determine a path for transmitting the packet according to the process shown in FIG. 1, and the connection cache information in the first data table has to be updated.

Optionally, in the method for packet forwarding in an embodiment of the present application, the first data table and the second data table are stored in a cache. The first data table and the second data table are stored in the form of cache data, such that the data can be accessed quickly, and thus the packet can be forwarded quickly and efficiently.

Optionally, the method for packet forwarding according to an embodiment of the present application further includes following steps.

At step 1, a connection identifier sent by a device with an updated configuration is obtained, wherein the device with the updated configuration is a packet sending/receiving device with the connection information changed.

When a packet sending/receiving device detects a change in its connection information, the device will update the connection identifier according to the preset update rule. When a packet sending/receiving device detects a change in its connection information, it means that the packet sending/receiving device detects that a configuration that affects the sending or receiving of a packet is changed. For example, the address of the packet sending/receiving device may be changed, a security group rule of the packet sending/receiving device may be changed, or an interface of a switch corresponding to the packet sending/receiving device may be changed. For another example, in a VPC of the public cloud, the control plane configuration may be changed, the user services support by the packet sending/receiving device may be migrated, or the like.

At step 2, the second data table with connection information corresponding to the connection identifier sent by the device is updated with the updated configuration.

In the second data table, the connection identifier of a device or the connection identifier of a user in the connection information, which corresponds to the connection identifier sent by the device with the updated configuration, is updated to the connection identifier sent by the device with the updated configuration. For example, a virtual switch receives a packet sent by device 1 indicating that the connection identifier of device 1 is 3. The virtual switch updates connection identifier of device 1 contained in the connection information in the second data table to 3. For another example, the virtual switch receives a packet sent by device 1 indicating that the connection identifier of user 4 is 3. The virtual switch updates the connection identifier of user 4 contained in the connection information in the second data table to 3.

In the embodiment of the present application, the connection information in the second data table is updated according to the corresponding connection identifier, which can guarantee that each piece of connection information recorded in the second data table remains the same as the current actual connection information of each device, thereby avoiding the failure of packet forwarding.

Optionally, after the connection information corresponding to the connection cache information from the second data table is obtained and the second identifier of the connection cache information is determined according to the connection information corresponding to the connection cache information, the method further includes following steps.

At step 1, if the second identifier of the connection cache information is different from the first identifier of the connection cache information, the connection cache information corresponding to the packet to be forwarded is deleted from the first data table.

For example, the first identifier of the connection cache information is 9, 11; and the second identifier of the connection cache information is 11, 11. The connection cache information is then deleted from the first data table. When the first identifier and the second identifier of the same one connection cache information are different, it indicates that the connection cache information has been invalidated. If packets are still forwarded according to this connection cache information, the sending of the packets will fail. The invalid connection cache information is deleted from the first data table, and packets are not forwarded according to the invalid connection cache information, which can prevent failure of packet forwarding.

At step 2, a destination address of the packet to be forwarded is obtained, and a transmission path for the packet to be forwarded is determined according to the destination address. The destination address is the address of the destination of the packet to be forwarded.

When the connection cache information is invalid, the virtual switch needs to perform a lookup on a MAC table or routing table to determine the transmission path for the packet to be forwarded.

At step 3, the transmission path for the packet to be forwarded is used as the current connection cache information, and connection information corresponding to the current connection cache information is obtained from the second data table, and a connection identifier for the current connection cache information is recorded according to the connection information corresponding to the current connection cache information.

In the second data table, the virtual switch obtains the current transmission path and the identifiers of packet sending/receiving devices on the current transmission path, which are used as the connection identifier for the current connection cache information.

At step 4, the connection identifier for the current connection cache information is used as the first identifier of the current connection cache information, and the current connection cache information and the first identifier of the current connection cache information are recorded into the first data table.

The virtual switch uses the connection identifier for the current connection cache information as the first identifier of the current connection cache information, and writes the current connection cache information and the first identifier of the current connection cache information into the first data table. Generally, the change in the connection information is due to the migration of user services. For example, if the server operates under high loads, user services will be migrated to another server in the layer-2 network. In this case, the connection identifier for the current connection cache information is the second identifier of the deleted connection cache information, and the second identifier of the deleted connection cache information may be used as the first identifier of the current connection cache information and then recorded in the first data table.

At step 5, the packet to be forwarded is forwarded according to the transmission path for this packet to be forwarded.

The virtual switch sends, via an interface indicated by the transmission path, the packet to be forwarded to a next-hop device that is indicated by the transmission path to receive the packet to be forwarded.

The connection cache information will become invalid, when the connection information is changed or when the control plane configuration is changed. The connection information may change, for example, a packet sending/receiving device may be added or deleted, a security group rule may be changed, the interface or address of a packet sending/receiving device may be changed, etc. The control plane configuration may change, for example, the packet forwarding service of user A may be migrated from virtual switch A to virtual switch B. When the first identifier and the second identifier of the connection cache information are different, the connection cache information is deleted, and the transmission path for the packet to be forwarded is determined by performing a lookup on the MAC table or the routing table. Compared to the prior art where all connection cache information in the first data table is traversed to delete the invalid connection cache information when a change in connection information of a device is detected each time, the present solution can greatly increase the packet forwarding speed, especially in the case where the first data table contains millions of pieces of connection cache information. It will take a lot of time to traverse the large amount of connection cache information in the first data table, which seriously affects the processing time for execution of a command from the control plane. The embodiment of the present application can greatly improve the packet forwarding efficiency by determining the first identifier and the second identifier.

In embodiments of the present application, a method for packet forwarding when the connection cache information is invalid is provided, and a method for establishing new connection cache information is also provided to facilitate subsequent forwarding of a packet according to the new connection cache information, so as to improve the packet forwarding speed and achieve a high efficiency of the packet forwarding.

Optionally, the destination address of the packet to be forwarded may be obtained and the transmission path for the packet to be forwarded may be determined according to the destination address in the following ways.

At step 1, if the destination address is in a same network segment as the address of the current switch, a lookup is performed on a MAC address table to determine path information for the packet to be forwarded. The path information includes a forwarding address(s) that is/are an address(es) of a next-hop device(s) for receiving the packet to be forwarded.

In the OSI (Open System Interconnection) model, layer-2, i.e. the data link layer, is based on MAC addresses. Each host or virtual machine on layer-2 has a fixed MAC address. The MAC address table maps MAC addresses to interfaces. By checking the MAC address table, an interface(s) corresponding to the destination address(es) in the packet to be forwarded can be determined, so as to determine the transmission path for the packet to be forwarded.

At step 2, a device to be applied a security group rule is determined according to the forwarding address in the path information, and the security group rule is applied on the device.

The virtual switch uses a device having the forwarding address in the path information as the device to which the security group rule needs to be applied, and sends a packet to the device to which the security group rule needs to be applied via the interface corresponding to the forwarding address to match the security group rule.

At step 3, a device that conforms to the security group rule is used as a receiver of the packet to be forwarded, so as to determine the transmission path for the packet to be forwarded.

The security group rule is used to provide information security of each packet sending/receiving device. When the security group rule is successfully matched, the communication connection between devices can be established. When the security group rule is not successfully matched, a communication connection between the devices is prohibited. The security group rule is configured according to actual requirements, which may be an identity-based security policy, a rule-based security policy, or a role-based security policy, etc. The successful matching of the security group rule means that specified information of the packet to be forwarded conforms to the preset rule. For example, when the source IP address of the packet to be forwarded is in a specified address segment, the security group rule is considered to be successfully matched.

In the embodiment of the present application, a method for packet forwarding based on MAC addresses is provided to implement packet forwarding on layer-2.

Optionally, the destination address of the packet to be forwarded is obtained and a transmission path for the packet to be forwarded is determined according to the destination address in the following ways.

At step 1, if the destination address is not in a same network segment as the address of the current switch, a lookup is performed on an access control list.

In the OSI model, when the destination address is not in the same network segment as the address of the current virtual switch, packets will be forwarded on layer-3, i.e. network layer. The virtual switch performs a lookup on the ACL (Access Control List) to determine whether to allow the device for sending the packet to be forwarded to communicate with the device for receiving the packet to be forwarded, that is, whether to allow the forwarding of the packet to be forwarded. Of course, the priority of forwarding the packet to be forwarded can also be determined through the lookup on the ACL.

At step 2, when the access control list allows to the packet to be forwarded, a lookup is performed on a routing table and a neighbor table to determine path information for the packet to be forwarded, wherein the path information includes a forwarding address that is the address of a next-hop device for receiving the packet to be forwarded.

The routing table records the routes from the current virtual switch to other particular network destinations, such as other switches or routers other than the current virtual switch. The neighbor table records a correspondence between interfaces of the current virtual switch and neighbor switches (switches as a next-hop). The current virtual switch first performs the lookup on the routing table to determine a next-hop switch to receive the packet to be forwarded, and then performs a lookup on the neighbor table to determine an interface for communicating with the switch that is to receive the packet to be forwarded. Thus, the path information of the packet to be forwarded is determined.

At step 3, a device to be applied a security group rule is determined according to the forwarding address in the path information, and the security group rule is applied on the device.

At step 4, a device that conforms to the security group rule is used as a receiver of the packet to be forwarded, so as to determine the transmission path for the packet to be forwarded.

In the embodiment of the present application, a method for packet forwarding based on the routing table and the neighbor table is provided to implement packet forwarding on layer-3.

Optionally, the first identifier of the connection cache information is obtained from the first data table in the following ways.

At step 1, the first data table for a key corresponding to a five-tuple of the packet to be forwarded is searched if the first data table contains the connection cache information corresponding to the packet, and the key is used as a key of the packet to be forwarded.

In an embodiment of the present application, the first data table is implemented in a manner of hash bucket, and a key of a corresponding hash bucket is obtained through the five-tuple of the packet to be forwarded. The five-tuple includes a source IP address, a source port, a destination IP address, a destination port, and a transport layer protocol. The corresponding hash bucket also stores information such as the source IP address, source port, destination IP address, destination port, and transport layer protocol. The hash buckets also store keys corresponding to connection cache information.

At step 2, a linked list head pointer at the key of the packet to be forwarded is obtained from the first data table in the form of Hash bucket.

At step 3, a linked list linked, to which the linked list head pointer points, is searched to obtain the connection cache information and the first identifier of the connection cache information.

The linked list pointed by the linked list head pointer records connection cache information corresponding to the linked list and the first identifier of the connection cache information. The connection cache information corresponding to the linked list refers to connection cache information having a five-tuple that is same as five-tuples in the hash bucket corresponding to the linked list.

In the embodiment of the present application, a method for searching for the connection cache information and the first identifier of a device in the first data table is provided. Hash buckets are used to find the connection cache information and the first identifier of the device, which improves the accuracy and efficiency of the searching.

Optionally, in an implementation of the embodiment of the present application, a read-write lock is set for each hash bucket.

A read-write lock is used for each hash bucket. The read-write lock allows concurrent read operations on a hash bucket, while allows at most one write operation on the hash bucket. The read-write lock does not allow a read operation(s) and a write operation on a hash bucket concurrently.

In the embodiment of the present application, a read-write lock is set for each hash bucket, which can be used for parallel operations in multi-core environments. The granularity of the read-write lock is small enough such that each read-write lock is implemented for one hash bucket, and different streams will not trigger a lock-wait situation.

Optionally, the Read-Copy Update technique is used to delete connection cache information having a first identifier different from the second identifier, so as to guarantee that the data plane does not release the data structure before the packet to be forwarded has been processed.

In an embodiment of the present application, the Read-Copy Update technique is used, such that the original connection cache information will not be deleted before the current connection cache information is updated, which prevents the virtual switch from crashing due to an access to the deleted data.

Optionally, after detecting whether the first data table contains the connection cache information corresponding to the packet to be forwarded, the method further includes following steps.

At step 1, if the first data table does not contain the connection cache information corresponding to the packet to be forwarded, the destination address of the packet to be forwarded is obtained, wherein the destination address is the address of a destination of the packet to be forwarded.

At step 2, if the destination address is in a same network segment as the address of the current switch, a lookup is performed on a MAC address table to determine path information for the packet to be forwarded, wherein the path information includes a forwarding address that is the address of a next-hop device for receiving the packet to be forwarded.

At step 3, a device to be applied a security group rule is determined according to the forwarding address in the path information, and the security group rule is applied on the device.

At step 4, a device that conforms to the security group rule is used as a receiver the packet to be forwarded, so as to determine the transmission path for the packet to be forwarded.

At step 5, the transmission path for the packet to be forwarded is used as current connection cache information.

At step 6, connection information corresponding to the current connection cache information is obtained from the second data table, a connection identifier for the current connection cache information is determined, the connection identifier of the current connection cache information is used as the first identifier of the current connection cache information, and the current connection cache information and the first identifier of the current connection cache information are recorded into the first data table.

The connection identifier of the current connection cache information is the second identifier of the original connection cache information.

At step 7, the packet to be forwarded is forwarded according to the transmission path for the packet to be forwarded.

In the embodiment of the present application, a method for packet forwarding based on MAC addresses is provided, to implement packet forwarding of a slow path based on MAC addresses on layer-2.

Optionally, after detecting whether the first data table contains the connection cache information corresponding to the packet to be forwarded, the method further includes following steps.

At step 1, if the first data table does not contain the connection cache information corresponding to the packet to be forwarded, the destination address of the packet to be forwarded is obtained, wherein the destination address is the address of the destination of the packet to be forwarded.

At step 2, if the destination address is not in a same network segment as the address of the current virtual switch, a lookup is performed on an access control list.

At step 3, when the access control list allows the packet to be forward, a lookup is performed on a routing table and a neighbor table to determine path information for the packet to be forwarded, wherein the path information includes a forwarding address(es) that is/are the address(es) of a next-hop device(s) for receiving the packet to be forwarded.

At step 4, a device to be applied a security group rule is determined according to the forwarding address in the path information, and the security group rule is applied on the device.

At step 5, a device that conforms to the security group rule is used as a receiver the packet to be forwarded, so as to determine the transmission path for the packet to be forwarded.

At step 6, the transmission path for the packet to be forwarded is used as current connection cache information.

At step 7, connection information corresponding to the current connection cache information is obtained from the second data table, a connection identifier for the current connection cache information is determined, the connection identifier of the current connection cache information is used as the first identifier of the current connection cache information, and the current connection cache information and the first identifier of the current connection cache information are recorded in the first data table.

The connection identifier of the current connection cache information is the second identifier of the original connection cache information.

At step 8, the packet to be forwarded is forwarded according to the transmission path for the packet to be forwarded.

In the embodiment of the present application, a method for packet forwarding based on a routing table and a neighbor table is provided, to implement packet forwarding of a slow path based on IP address in layer-3.

Optionally, for techniques such as SR-IOV (Single-root I/O Virtualization), an embodiment of the present application may send connection cache information to a network card for each virtual machine that sends and receives packets, so as to achieve fast forwarding on network card level. To this end, the virtual switch is transformed into a forwarding rule generator. The virtual switch sends contents of the first data table and the second data table to a network card of a host where a virtual machine that sends and receives packets is located. For a network card that supports SR-IOV configuration flow (packet flow) forwarding, when recording connection cache information, rules in two directions may be generated to call an interface for sending a flow rule (transmission rule) provided by a physical network card. A subsequent data packet will be directly forwarded at the network card. When a packet to be forwarded reaches a network card of a host, the network card forwards the packet to be forwarded by using the method for packet forwarding according to the first data table and the second data table. For example, the network card obtains the packet to be forwarded, and detects whether connection cache information corresponding to the packet to be forwarded is contained in the first data table. If the first data table contains the connection cache information corresponding to the packet to be forwarded, the network card obtains the first identifier of the connection cache information in the first data table. The network card obtains connection information related to the connection cache information in the second data table, and determines the second identifier of the connection cache information. If the first identifier and the second identifier of the connection cache information are the same, the network card forwards the packet to be forwarded according to the connection cache information. When the flow rule of the network card does not match, the packet is transmitted to the virtual switch to be processed. Packets are directly forwarded through a network card to achieve packet forwarding on the physical layer, which can further speed up the packet forwarding.

In the embodiment of the present application, the packet forwarding speed is further accelerated by three forwarding methods based on a network card, a fast path of a virtual switch, and a slow path of a virtual switch, which solves the problem of a low performance of packet forwarding on a virtual switch driven by a virtual network card based on virtio (virtio is an abstraction layer above a device in a para-virtualization Hypervisor), and the problem that a virtual switch cannot control the processing of a packet because the SR-IOV based network card Virtual Function directly accesses the internal of the virtual switch.

Figure 3:
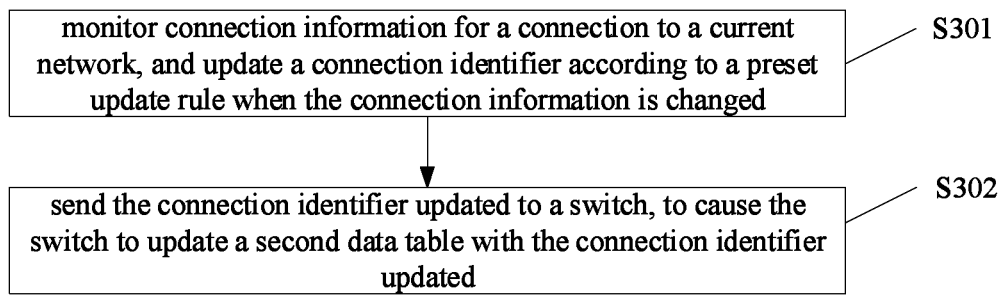
FIG. 3 is a schematic flowchart of a method for packet forwarding according to an embodiment of the present application, which is applicable to a packet sending device or a packet receiving device.

Referring to FIG. 3, an embodiment of the present application provides a method for packet forwarding, which is applicable to a packet sending/receiving device. The method includes steps S301-S302.

At step S301, connection information for connecting to a current network is monitored, and a connection identifier is updated according to a preset update rule when the connection information for connecting to the current network is changed.

When the connection information for connecting to the current network is changed, it means that the packet sending/receiving device detects that a configuration that affects packet sending or receiving is changed. For example, the address of the packet sending/receiving device is changed, a security group rule of the packet sending/receiving device is changed, or the interface of a switch corresponding to the packet sending/receiving device is changed. For another example, in a VPC of a public cloud, the control plane configuration is changed, the user service carried on the packet sending/receiving device is migrated, or the like.

The preset update rule may be any rule that can update the connection identifier without repetition. For example, the initial value of the connection identifier of each packet sending/receiving device or user is set to 1. When the packet sending/receiving device detects that its connection information is changed, the value of the connection identifier is increased by 1 to obtain an updated connection identifier. Each time the connection information of the packet sending/receiving device is changed, its connection identifier will be changed. This facilitates a switch to identify the current state of the packet sending/receiving device, and prevents the switch from updating the second data table by mistake.

When the packet sending/receiving device detects that its connection information with the current network is changed, the packet sending/receiving device will update the corresponding connection identifier according to the preset update rule. For example, the connection identifier of the packet sending/receiving device 1 currently is 3. When the packet sending/receiving device 1 detects that its security group rule is changed, the packet sending/receiving device 1 updates its connection identifier to 4. For another example, the connection identifier of user 3 served by the packet sending/receiving device 1 currently is 2. When the services of user 3 are migrated to another packet sending/receiving device 2, the packet sending/receiving device 1 updates the connection identifier of user 3 to 3.

At step S302, the connection identifier updated is sent to a switch, to cause the switch to update a second data table with the connection identifier updated.

For example, the packet sending/receiving device 1 sends information to a virtual switch which indicates that the connection identifier of the packet sending/receiving device 1 has updated to 4. After receiving the information, the virtual switch updates the connection identifier in the connection information of the packet sending/receiving device 1 in the second data table to 4. For another example, the packet sending/receiving device 1 sends information to a virtual switch which indicates that the connection identifier of user 3 has updated to 3. After receiving the information, the virtual switch updates the connection identifier in the connection information of user 3 in the second data table to 3.

Optionally, the method for packet forwarding applicable to a packet sending/receiving device according to the embodiment of the present application is explained below by way of an example. The connection identifier user_age of a packet sending/receiving device A is 7, i.e., user_age=7, which serves a user B. When the services of the user B are ended, the packet sending/receiving device A turns to serve a user C, and the packet sending/receiving device A updates the connection identifier to 8, i.e., user_age=8. When the packet sending/receiving device A sends a packet to a virtual switch, user_age=8 is added into the packet, so that the virtual switch updates the connection identifier of the packet sending/receiving device A in the second data table after receiving the packet.

In the embodiment of the present application, when the connection information of the packet sending/receiving device is changed, the connection identifier is updated, and the updated connection identifier is sent to the switch, so that the switch updates the second data table with the updated connection identifier. The switch subsequently forwards a packet to be forwarded according to the first data table and the second data table, which can avoid a failure of the packet forwarding and achieve the packet forwarding with high efficiency.

Optionally, the updated connection identifier is sent to the switch in the following way.

When a packet to be forwarded is sent to the switch each time, the updated connection identifier is added to the packet to be forwarded.

The current connection identifier is added to the packet to be forwarded when sending the packet to be forwarded each time, which can reduce signaling loads compared with sending the updated connection identifier separately after the packet sending/receiving device updates the connection identifier each time.

Optionally, the updated connection identifier is sent to the switch in the following way.

When the connection identifier is updated each time, the updated connection identifier is sent to the switch immediately.

When the packet sending/receiving device changes the connection identifier, it immediately sends the current connection identifier to the virtual switch. Compared with adding the connection identifier to the packet to be forwarded, this can guarantee a high consistency between the connection identifier in the connection information recorded in the second data table and the current actual connection identifier, thus preventing the failure of forwarding the packet to be forwarded due to delay.

Figure 4:
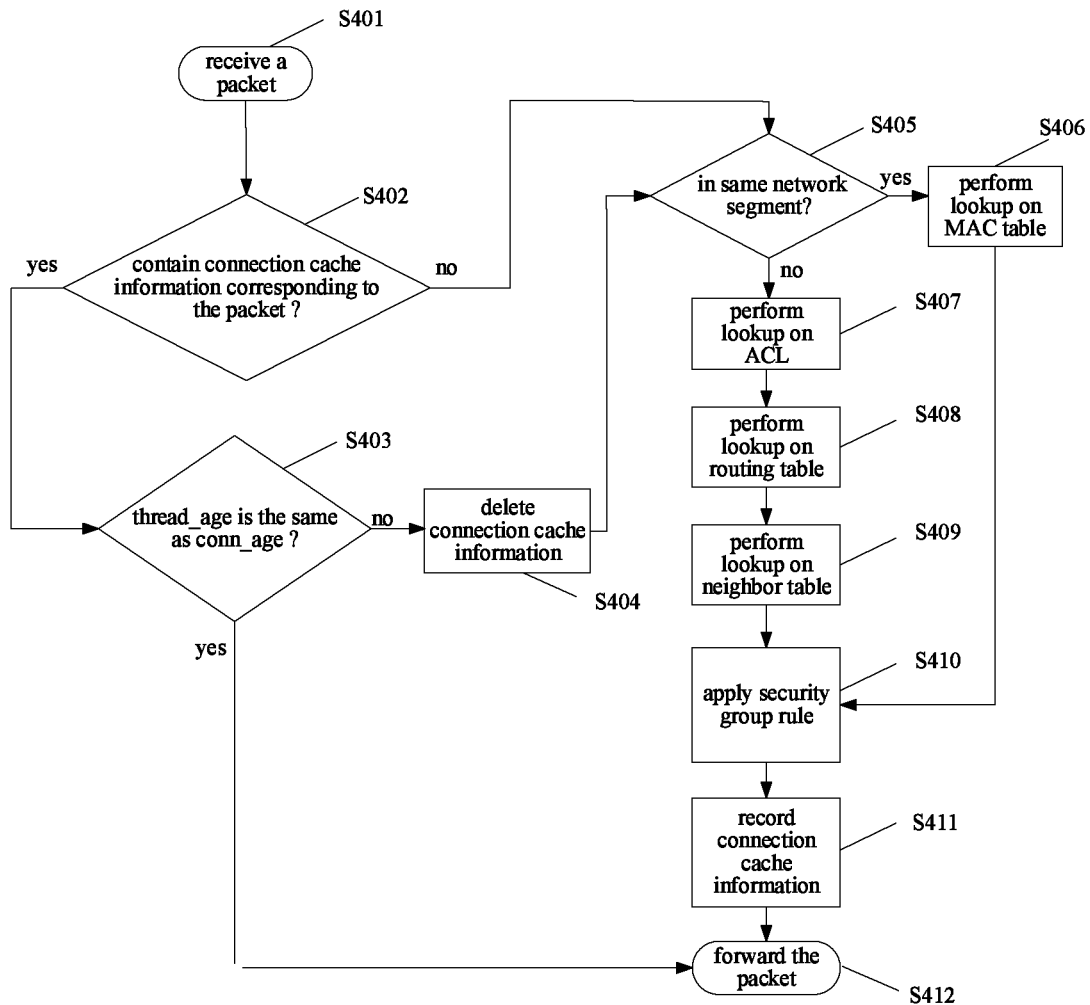
FIG. 4 is a schematic flowchart of another method for packet forwarding according to an embodiment of the present application, which is applicable to a switch.

Referring to FIG. 4, a schematic flowchart of another method for packet forwarding according to an embodiment of the present application is shown, which is applicable to a switch. The method includes following steps.

At step S401, a virtual switch receives a packet.

A virtual switch is a core component in a VPC of a public cloud, and is configured for isolation of virtual machines, packet forwarding on layer-2 and layer-3 in the network, and security processing or other functions. At present, there are multiple solutions for isolation in the VPC technology. The VXLAN (Virtual Extensible LAN) is the most common solution. In the VXLAN, a packet is encapsulated with a UDP header and VXLAN header, to implement a natural routing on layer-3 under the underlay network. When receiving a packet, the virtual switch, acting as a terminal end of the VXLAN, will decapsulate the received VXLAN packet, and forward the packet to a virtual machine according to the corresponding forwarding entry. When a virtual machine sends a packet outwards, a switch obtains the packet sent by the virtual machine, encapsulates the packet as a VXLAN encapsulation, and then determine a route and sends the packet out. Therefore, packets communicated on the underlay network are encapsulated.

The VPCs (Virtual Private Cloud, private network) of the public cloud support multiple users to share the public loud, and each user has to a VXLAN identifier, such as a VXLAN ID, to isolate the users from each other. For each user, an independent data structure is stored on the virtual switch to record connection cache information for layer-2 and connection cache information for layer-3. The virtual switch forwards a received packet based on MAC addresses in an FDB (Forwarding Data Base) on layer-2, and forwards the packet based on the routing table and neighbor table on layer-3.

At step S402, the virtual switch detects whether there is connection cache information corresponding to the packet. If there is the connection cache information corresponding to the packet, the method proceeds to step S403. If there is no connection cache information corresponding to the packet, the method proceeds to step S405.

The virtual switch searches for a key corresponding to a five-tuple of the packet to be forwarded in a first data table, and using the key as a key of the packet; obtains in the first data table a linked list head pointer at a hash bucket corresponding to the key; searches a linked list pointed to by the linked list head pointer to obtain the connection cache information and the first identifier conn_age of the connection cache information. The connection cache information includes a transmission path for the packet. If the virtual switch identifies the connection cache information corresponding to the packet in the first data table, it is determined that the connection cache information corresponding to the packet is contained in the first data table. If the virtual switch identifies no connection cache information corresponding to the packet in the first data table, it is determined that the connection cache information corresponding to the packet is not contained in the first data table.

The conn_age of the connection cache information is the second identifier thread_age of a user corresponding to the connection cache information when the connection cache information is established. In the VPC environment of the public cloud, a connection identifier user_age is maintained for each user. When sending a packet, a packet sending/receiving device, such as a virtual machine, adds the user's user_age to the packet. When a virtual switch receives the packet, it reads the user_age of the user, and updates the value of the user's thread_age to the value of the user's user_age.

The first data table is implemented in the form of hash buckets. A hash bucket stores a five-tuple(s) of a packet(s) that has been successfully forwarded and a corresponding key. The offset of the key corresponds to a linked list head pointer, which refers to a linked list in which connection cache information and the first identifier of each device corresponding to the connection cache information are recorded. A read-write lock is maintained for each hash bucket. The read-write lock allows concurrent read operations on a hash bucket, while allows at most one write operation on a hash bucket, and the read-write lock does not allow a read operation(s) and a write operation on a hash bucket concurrently. The read-write lock can be used for parallel operations in multi-core environments. The granularity of the read-write lock is small enough such that each read-write lock is implemented for one hash bucket, and different streams will not trigger a lock-wait operation.

At step S403, the virtual switch obtains the thread_age and conn_age of the connection cache information, and determines whether the conn_age and thread_age of the connection cache information are the same. If they are different, the method proceeds to step S404; otherwise, the method proceeds to step S412.

The virtual switch searches a cached second data table, which records identifiers of users and the values of thread_age for the users. The second data table may be a hash table or column data, etc.

The thread_age in the second data table is maintained according to the user_age sent by a packet sending/receiving device. In a VPC of the public cloud environment, a variable user_age is maintained for each user. When a configuration that affects the user's connection cache information is changed, the value of the user_age of the user is increased, to indicate the data plane that the configuration is changed. When sending a packet, a packet sending/receiving device adds the user_age of the user to the packet. When a virtual switch in the data plane receives the packet, it reads the user_age of the user. If the value of the user_age of the user is different from the value of the thread_age of the user, the value of the thread_age of the user is updated to the value of the user_age of the user. The packet sending/receiving device adds the user_age to the packet, which can save signaling loads compared to sending the user_age separately.

At step S404, the connection cache information is deleted.

If the first identifier and the second identifier of the connection cache information are different, it indicates that the connection cache information has become invalid. If a packet is forwarded according to the invalid connection cache information, the forwarding of the packet will fail. Thus, this connection cache information is to be deleted.

Optionally, the RCU (Read-Copy Update) method is used to delete the connection cache information having a first identifier different from the second identifier, so as to guarantee that the data plane does not release the data structure before the packet to be forwarded has been processed. By using the RCU technique, the original connection cache information will not be deleted before the current connection cache information is updated, which prevents the virtual switch from crashing due to the access to the deleted data.

Figure 5:
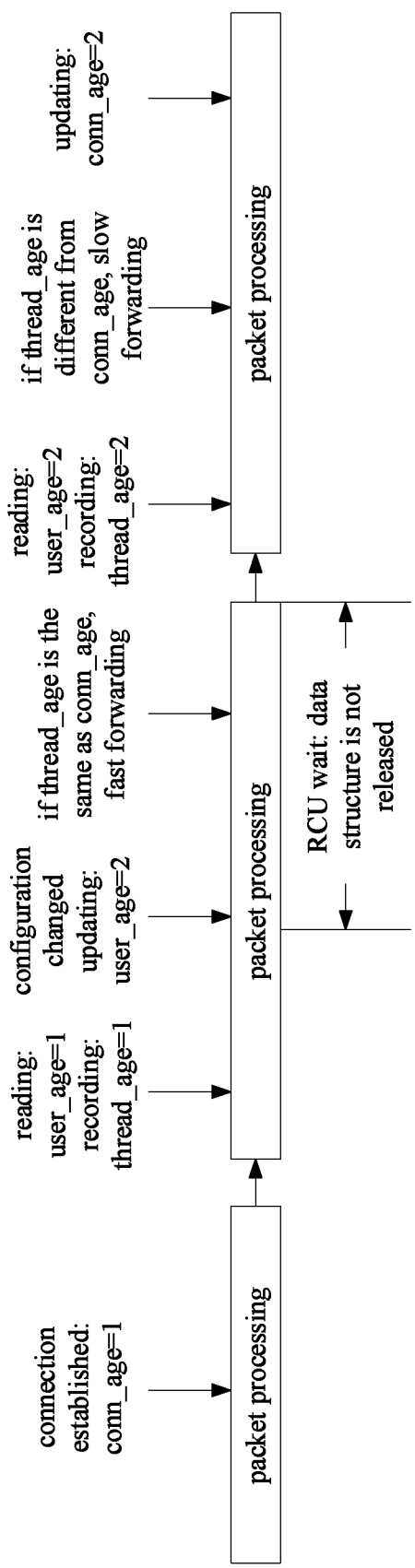
FIG. 5 is a schematic diagram of deleting connection cache information in an RCU manner according to an embodiment of the present application.

Referring to FIG. 5, a schematic diagram of deleting connection cache information with the RCU technique according to an embodiment of the present application is shown. When forwarding a packet, after a connection is established (i.e., after the packet is forwarded), connection cache information and the conn_age (wherein the conn_age=1) of the current user are saved. Then, the virtual switch receives a first packet, reads the user_age (wherein the user_age=1) of the current user in the first packet, and records the thread_age (wherein the thread_age=1) of the current user. Since the configuration is changed, the user_age of the user is updated to 2. After that, the virtual switch receives a second packet, and the user_age of the current user in the second packet is 2. For the first packet, the thread_age and conn_age are the same, conn_age=thread_age, a fast forwarding may be performed, that is, the virtual switch forwards the packet according to the connection cache information in the cache. The user_age (wherein the user_age=2) of the current user in the second packet is read, and the thread_age of the current user is correspondingly updated to 2. For the second packet, since the conn_age is not equal to the thread_age, the connection cache information in the cache has to be deleted, and a slow forwarding is operated, that is, the virtual switch forwards the packet according to a lookup on a forwarding table such as a MAC table or a routing table or the like. While for the first packet, the virtual switch is reading the connection cache information in the cache at this time. If the connection cache information is released at this time, the virtual switch will crash because it tries to read the released data. Therefore, by using the RCU technique, the current connection cache information in the cache will not be deleted before new connection cache information is established. The first packet is forwarded with the fast path according to the current connection cache information. For the second packet, it is forwarded with the slow path by searching the MAC address table or routing table, etc., new connection cache information is established, and the conn_age of the current user is recorded as 2.

The solution of packet forwarding using the RCU technique and in combination with the conn_age, thread_age, and user_age guarantees a synchronous update of connection cache information on the data plane and on the control plane in the process of forwarding a packet. At step S405, it detects whether the source address and the destination address of the packet are in a same network segment. If the source address and the destination address of the packet are in the same network segment, the method proceeds to step S406; otherwise, the method proceeds to step S407.

In the OSI model, the layer-2, i.e., the data link layer, is based on MAC addresses, and the layer-3, i.e., the network layer, is based on IP addresses. If the source address and the destination address of the packet are in the same network segment, the packet is forwarded on layer-2. If the source address and the destination address of the packet are not in the same network segment, the packet is forwarded on layer-3.

At step S406, a lookup on a MAC address table is performed to determine a transmission path for the packet, and then the method proceeds to step S410.

Specifically, the MAC address table is an FDB, and the FDB maintains the MAC address of each packet sending/receiving device that communicates with the virtual switch. By searching the MAC address, a next-hop device for receiving the packet and an interface for communication between the virtual switch and the next-hop device may be determined.

At step S407, a lookup is performed on an ACL.

The ACL is a list of instructions attached to interfaces of routers or switches, and is used for controlling inbound and outbound packets via the interfaces. The virtual switch performs a lookup on the ACL to determine whether to allow a device sending the packet to access a device receiving the packet, that is, whether to allow the forwarding of the packet. Of course, priority of forwarding the packet can also be determined by searching the ACL.

At step S408, a lookup is performed on a routing table.

The routing table records paths from the current virtual switch to other specific network terminals. The virtual switch determines the route for forwarding the packet through the lookup on the routing table.

At step S409, a lookup is performed on a neighbor table to determine a transmission path for the packet.

The neighbor table records a correspondence between interfaces of the current virtual switch and neighbor switches (switches as a next-hop). The virtual switch performs the lookup on the neighbor table to determine an interface for a next-hop device for receiving the packet, so as to determine the transmission path for the packet.

At step S410, a security group rule is applied.

The security group rule is used to protect the security of information of each packet sending/receiving device. When the security group rule is conformed to, the communication connection between devices can be established. When the security group rule is not conformed to, communication connection between the devices is prohibited.

Each virtual machine may be associated with a security group. The virtual machines in a same security group can trust and communicate with each other directly. When virtual machines in different security groups communicate with each other or when a virtual machine accesses to the public network, the security group rule is matched. When the security group rule is successfully matched, a communication connection is established to guarantee a returned packet can be forwarded directly. Each second layer subnet may be associated to an ACL rule, to implement stateless rule matching. When a packet is to be transmitted between subnets, the ACL rule is applied. Security protection on two levels is implemented by setting the security group and ACL.

At step S411, the connection cache information is recorded.

After the transmission path for the packet is determined and the security rule is successfully matched, the virtual switch caches the connection cache information corresponding to the packet. The connection cache information includes the transmission path and the conn_age, and may also include information such as the five-tuple, etc.

At step S412, the packet is forwarded according to the transmission path for the packet.

In the embodiment of the present application, if the second identifier is the same as the first identifier, it means that the connection cache information is not invalid. The packet to be forwarded is forwarded according to the connection cache information, which achieves a fast path for forwarding of the packet to be forwarded, and avoids the failure of forwarding the packet. Compared to the prior art where all connection cache information in the first data table is traversed to delete the invalid connection cache information when a change in connection information of a device is detected each time, the present solution can greatly increase the packet forwarding speed, especially in the case where the first data table contains millions of pieces of connection cache information. It will take a lot of time to traverse the large amount of connection cache information in the first data table, which seriously affects the processing time for execution of a command from the control plane. The embodiment of the present application can greatly improve the packet forwarding efficiency by determining the first identifier and the second identifier. The packet forwarding efficiency can be greatly improved.

For virtual switches, there are mainly two solutions currently which are self-developed virtual switches and OVSs (Open Switches). For a self-developed virtual switch, forwarding a packet from a virtual machine requires at least more than two lookup operations on a table, which wastes time. Compared to the data plane, the control plane may be less changed. For a same traffic, the results obtained by lookups on the table under the same configuration are the same. In most scenarios, the security group needs to be matched to establish a connection. The present application establishes a connection as the first processes when a packet is received. When forwarding the packet, it first checks whether a corresponding connection exists. If so, the packet is forwarded according to the connection cache information, which avoids the lookup on the routing table, and improves the efficiency of the packet forwarding. For the OVS solution, when the first packet of a message is in the kernel state and is not conformed to the rule, it will be transmits to the user state, which causes an exchange of the first packet between the kernel state and the user state. The OVS solution is too heavy as a whole, which is not conducive to the requirement of the frequently changed public cloud environment. The method for packet forwarding in the embodiment of the present application has the advantages of the self-developed virtual switch solution and the OVS solution, a simple and clear logical structure, and an easy adjustment for changes. The delay for processing the first packet is reduced, and the packet forwarding speed is improved.

Of course, the method for packet forwarding in the embodiment of the present application is applicable to an OVS. After receiving a packet, the OVS detects whether connection cache information corresponding to the packet exists. When the connection cache information corresponding to the packet exists, and the corresponding first identifier and the second identifier of the connection cache information are the same, the packet is sent according to the connection cache information. Otherwise, the first packet is transmitted to the user status, and is sent according to the existing OVS solution. The connection cache information is generated and recorded after the packet is sent. The embodiment of the present application provides a method for packet forwarding in OVS solution, which can reduce errors in packet forwarding.

Figure 6:
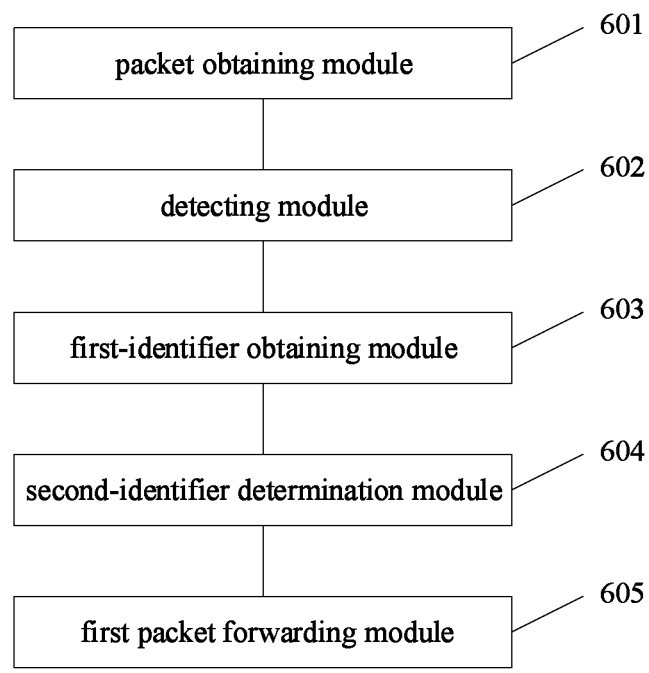
FIG. 6 is a diagram showing the structure of an apparatus for packet forwarding according to an embodiment of the present application, which is applicable to a switch.

Referring to FIG. 6, an embodiment of the present application provides an apparatus for packet forwarding, which is applicable to a switch. The apparatus may include: a packet obtaining module 601, a detecting module 602, a first-identifier obtaining module 603, a second-identifier determination module 604, and a first packet forwarding module 605.

The packet obtaining module 601 is configured for obtaining a packet to be forwarded.

The detecting module 602 is configured for detecting whether a first data table contains connection cache information corresponding to the packet.

The first-identifier obtaining module 603 is configured for obtaining a first identifier of the connection cache information from the first data table if the first data table contains the connection cache information corresponding to the packet, wherein the first identifier is a connection identifier corresponding to the connection cache information when the connection cache information is established.

The second-identifier determination module 604 is configured for obtaining connection information corresponding to the connection cache information from a second data table, and determining a second identifier of the connection cache information according to the connection information corresponding to the connection cache information, wherein the second identifier is a current connection identifier corresponding to the connection cache information and changes when the connection information changes.

The first packet forwarding module 605 is configured for forwarding the packet based on the connection cache information if the second identifier is the same as the first identifier.

In the embodiment of the present application, if the second identifier is the same as the first identifier, it means that the connection cache information is not invalid. The packet to be forwarded is forwarded according to the connection cache information, which achieves a fast path for forwarding of the packet to be forwarded, avoids the failure of forwarding the packet, and achieves high efficiency of packet forwarding.

Optionally, the apparatus for packet forwarding according to the embodiment of the present application further includes a connection identifier obtaining module and an identifier updating module.

The connection identifier obtaining module is configured for obtaining a connection identifier sent by a device with an updated configuration, wherein the device with the updated configuration is a packet sending/receiving device with the connection information changed.

The identifier updating module is configured for updating the second data table with connection information corresponding to the connection identifier sent by the device with the updated configuration.

In the embodiment of the present application, the connection information in the second data table is updated according to the corresponding connection identifier, which can guarantee that each piece of connection information recorded in the second data table remains the same as the current actual connection information of each device, thereby avoiding the failure of packet forwarding.

Optionally, the apparatus for packet forwarding according to the embodiment of the present application further includes a connection information deleting module, a first transmission path determination module, a first cache information determination module, a first data table updating module, and a second packet forwarding module.

The connection information deleting module is configured for deleting the connection cache information corresponding to the packet from the first data table if the second identifier is different from the first identifier.

The first transmission path determination module is configured for obtaining a destination address of the packet and determining a transmission path for the packet according to the destination address.

The first cache information determination module is configured for using the transmission path for the packet as current connection cache information, obtaining connection information corresponding to the current connection cache information from the second data table, and determining a connection identifier for the current connection cache information according to the connection information corresponding to the current connection cache information.

The first data table updating module is configured for using the connection identifier for the current connection cache information as the first identifier of the current connection cache information, and recording the current connection cache information and the first identifier of the current connection cache information into the first data table.

The second packet forwarding module is configured for forwarding the packet according to the transmission path for the packet.

In the embodiment of the present application, a method for packet forwarding when the connection cache information is invalid is provided, and a method for establishing new connection cache information is also provided to facilitate subsequent forwarding of a packet according to the new connection cache information, so as to improve the packet forwarding speed and achieve a high efficiency of the packet forwarding.

Optionally, the first transmission path determination module includes a first path information determination sub-module, a first security group matching sub-module, and a first device connection sub-module.

The first path information determination sub-module is configured for performing a lookup on a MAC address table to determine path information for the packet if the destination address is in a same network segment as an address of the switch, wherein the path information comprises a forwarding address, the forwarding address being an address of a next-hop device for receiving the packet.

The first security group matching sub-module is configured for determining a device to be applied a security group rule according to the forwarding address in the path information, and applying the security group rule on the device.

The first device connection sub-module is configured for using the device as a receiver of the packet if the security group rule is matched, so as to determine the transmission path for the packet.

In the embodiment of the present application, a method for packet forwarding based on MAC addresses is provided to implement packet forwarding on layer-2.

Optionally, the first transmission path determination module includes an access searching sub-module, a second path information determination sub-module, a second security group matching sub-module, and a second device connection sub-module.

The access searching sub-module is configured for performing a lookup on an access control list if the destination address is not in a same network segment as an address of the switch.

The second path information determination sub-module is configured for performing a lookup on a routing table and a neighbor table to determine path information for the packet when the access control list allows the packet to be forwarded, wherein the path information comprises a forwarding address, the forwarding address being an address of a next-hop device for receiving the packet.

The second security group matching sub-module is configured for determining a device to be applied a security group rule according to the forwarding address in the path information, and applying the security group rule on the device.

The second device connection sub-module is configured for using the device as a receiver of the packet if the security group rule is matched, so as to determine the transmission path for the packet.

In the embodiment of the present application, a method for packet forwarding based on the routing table and the neighbor table is provided to implement packet forwarding on layer-3.

Optionally, the first-identifier obtaining module includes a key obtaining sub-module, a pointer obtaining sub-module, and an identifier searching sub-module.

The key obtaining sub-module is configured for searching the first data table for a key corresponding to a five-tuple of the packet if the first data table contains the connection cache information corresponding to the packet, and using the key as a key of the packet.

The pointer obtaining sub-module is configured for obtaining a linked list head pointer at the key of the packet in the first data table in a form of Hash bucket.

The identifier searching sub-module is configured for searching in a linked list pointed to by the linked list head pointer, to obtain the connection cache information and the first identifier of the connection cache information.

In the embodiment of the present application, a method for searching for the connection cache information and the first identifier of a device in the first data table is provided. Hash buckets are used to find the connection cache information and the first identifier of the device, which improves the accuracy and efficiency of the searching.

Optionally, the apparatus for packet forwarding according to the embodiment of the present application further includes a first destination address obtaining module, a first transmission path determination module, a first rule matching module, a second transmission path determination module, a second cache information determination module, a first recording module, and a third packet forwarding module.

The first destination address obtaining module is configured for obtaining a destination address of the packet if the first data table does not contain the connection cache information corresponding to the packet, wherein the destination address is an address of a destination of the packet.

The first transmission path determination module is configured for performing a lookup on a MAC address table to determine path information for the packet if the destination address is in a same network segment as an address of the switch, wherein the path information comprises a forwarding address, the forwarding address being an address of a next-hop device for receiving the packet.

The first rule matching module is configured for determining a device to be applied a security group rule according to the forwarding address in the path information, and applying the security group rule on the device.

The second transmission path determination module is configured for using the device as a receiver of the packet if the security group rule is matched, so as to determine the transmission path for the packet.

The second cache information determination module is configured for using the transmission path for the packet as current connection cache information.

The first recording module is configured for obtaining connection information corresponding to the current connection cache information from the second data table, determining a connection identifier for the current connection cache information, using the connection identifier for the current connection cache information as the first identifier of the current connection cache information, and recording the current connection cache information and the first identifier of the current connection cache information into the first data table.

The third packet forwarding module is configured for forwarding the packet according to the transmission path for the packet.

In the embodiment of the present application, a method for packet forwarding based on MAC addresses is provided, to implement packet forwarding of a slow path based on MAC addresses on layer-2.

Optionally, the apparatus for packet forwarding according to the embodiment of the present application further includes a second destination address obtaining module, a control list searching module, a second transmission path determination module, a second rule matching module, a third transmission path determination module, a third cache information determination module, a second recording module, and a fourth packet forwarding module.

The second destination address obtaining module is configured for obtaining a destination address of the packet if the first data table does not contain the connection cache information corresponding to the packet, wherein the destination address is an address of a destination of the packet.

The control list searching module is configured for performing a lookup on an access control list if the destination address is not in a same network segment as an address of the switch.

The second transmission path determination module is configured for performing a lookup on a routing table and a neighbor table to determine path information for the packet when the access control list allows the packet to be forwarded, wherein the path information comprises a forwarding address, the forwarding address being an address of a next-hop device for receiving the packet.

The second rule matching module is configured for determining a device to be applied a security group rule according to the forwarding address in the path information, and applying the security group rule on the device.

The third transmission path determination module is configured for using the device as a receiver of the packet if the security group rule is matched, so as to determine a transmission path for the packet.

The third cache information determination module is configured for using the transmission path for the packet as current connection cache information.

The second recording module is configured for obtaining connection information corresponding to the current connection cache information from the second data table, determining a connection identifier for the current connection cache information, using the connection identifier for the current connection cache information as the first identifier of the current connection cache information, and recording the current connection cache information and the first identifier of the current connection cache information into the first data table.

The fourth packet forwarding module is configured for sending forwarding the packet according to the transmission path for the packet.

Figure 7:
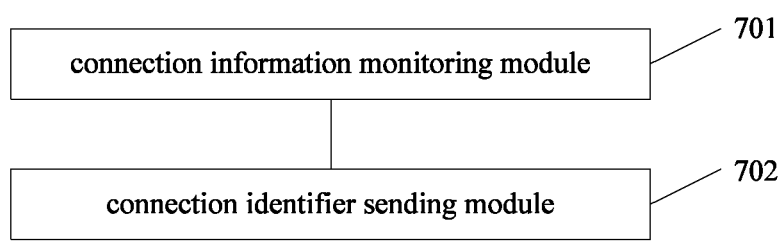
FIG. 7 is a diagram showing the structure of an apparatus for packet forwarding according to an embodiment of the present application, which is applicable to a packet sending device or a packet receiving device.

Referring to FIG. 7, an embodiment of an apparatus for packet forwarding is provided, which is applicable to a packet sending/receiving device. The apparatus includes a connection information monitoring module 701 and a connection identifier sending module 702.

The connection information monitoring module 701 is configured for monitoring connection information for connecting to a current network, and updating a connection identifier according to a preset update rule when the connection information is changed.

The connection identifier sending module 702 is configured for sending the connection identifier updated to a switch to cause the switch to update a second data table with the connection identifier updated.

In the embodiment of the present application, when the connection information of the packet sending/receiving device is changed, the connection identifier is updated, and the updated connection identifier is sent to the switch, so that the switch updates the second data table with the updated connection identifier. The switch subsequently forwards a packet to be forwarded according to the first data table and the second data table, which can avoid a failure of the packet forwarding and achieve the packet forwarding with high efficiency.

An embodiment of the present application further provides a switch, including a processor and a machine-readable storage medium. The machine-readable storage medium stores machine executable instructions that can be executed by the processor, and the processor is caused by the machine executable instructions to perform steps including:

step 1, obtaining a packet to be forwarded;

step 2, detecting whether a first data table contains connection cache information corresponding to the packet;

step 3, obtaining a first identifier of the connection cache information from the first data table if the first data table contains the connection cache information corresponding to the packet, wherein the first identifier is a connection identifier corresponding to the connection cache information when the connection cache information is established;

step 4, obtaining connection information corresponding to the connection cache information from a second data table, and determining a second identifier of the connection cache information according to the connection information corresponding to the connection cache information, wherein the second identifier is a current connection identifier corresponding to the connection cache information and when the connection information corresponding to the connection cache information is changed, the current connection identifier for the connection cache information in which the connection information is changed is correspondingly changed; and step 5, forwarding the packet based on the connection cache information if the second identifier is the same as the first identifier.

In the embodiment of the present application, if the second identifier is the same as the first identifier, it means that the connection cache information is not invalid. The packet to be forwarded is forwarded according to the connection cache information, which achieves a fast path for forwarding of the packet to be forwarded, avoids the failure of forwarding the packet, and achieves high efficiency of packet forwarding.

Of course, the processor, when caused by the machine executable instructions, can also implement any step of the method for packet forwarding applicable to a switch.

An embodiment of the present application further provides a packet sending/receiving device, including a processor and a machine-readable storage medium having stored thereon machine executable instructions that, when executed by the processor, cause the processor to perform steps including:

step 1, monitoring connection information for connecting to a current network, and updating a connection identifier according to a preset update rule when the connection information is changed;

step 2, sending the connection identifier updated to a switch to cause the switch to update a second data table with the connection identifier updated.

In the embodiment of the present application, when the connection information of the packet sending/receiving device is changed, the connection identifier is updated, and the updated connection identifier is sent to the switch, so that the switch updates the second data table with the updated connection identifier. The switch subsequently forwards a packet to be forwarded according to the first data table and the second data table, which can avoid a failure of the packet forwarding and achieve the packet forwarding with high efficiency.

Of course, when executing the machine executable instructions, the processor can also be caused to carry out any step of the method for packet forwarding applicable to a packet sending/receiving device.

The readable storage medium may include a random access memory (RAM), and may also include a non-volatile memory (NVM), such as at least one disk memory. Optionally, the readable storage medium may also be at least one storage device located away from the processor.

The above processor may be a general purpose processor, including a central processing unit (CPU), a network processor (NP), etc.; it may also be a digital signal processor (DSP), an application specific integrated circuit (ASIC), a field-programmable gate array (FPGA) or other programmable logic devices, discrete gates or transistor logic devices, discrete hardware components.

An embodiment of the present application provides a computer-readable storage medium storing a computer program which, when executed by a processor to, causes the processor to carry out any method for packet forwarding applicable to a switch.

An embodiment of the present application provides a computer-readable storage medium storing a computer program that, when executed by a processor, causes the processor to carry out any method for packet forwarding applicable to a packet sending/receiving device.

An embodiment of the present application provides a computer program product comprising instructions that, when executed on a computer, cause the computer to perform any method for packet forwarding applicable to a switch.

An embodiment of the present application provides a computer program product comprising instructions that, when executed on a computer, cause the computer to perform any method for packet forwarding applicable to a packet sending/receiving device.

An embodiment of the present application provides a computer program that, when executed on a computer, causes the computer to perform any method for packet forwarding applicable to a switch.

An embodiment of the present application provides a computer program that, when executed on a computer, causes the computer to perform any method for packet forwarding applicable to a packet sending/receiving device.

For embodiments of the apparatus for packet forwarding/switch/packet sending/receiving device/readable storage medium/computer program product/computer program, since they are basically similar to the method embodiments, the description is relatively brief, related parts can be referred to the corresponding description of the method embodiments.

It should be noted that the relationship terms used herein such as "first", "second", and the like are only for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. In particular, the embodiment of the system is described briefly since it is substantially similar to the method embodiment, and the related parts can be referred to the corresponding description of the method embodiment.

The embodiments described above are simply preferable embodiments of the present application, and are not intended to limit the present application. Any modifications, alternatives, improvements, or the like within the spirit and principle of the present application shall be included within the scope of protection of the present application.

INDUSTRIAL APPLICABILITY

The method, apparatus, switch, device for packet forwarding and storage medium provided herein can reduce errors in packet forwarding and prevent packets from losing. Moreover, it is not required to traverse all connection cache information to delete the invalid path, which can save processing resources.

The invention claimed is:

1. A method for packet forwarding, applicable to a switch, comprising:
obtaining a packet to be forwarded;
detecting whether a first data table contains connection cache information corresponding to the packet;
obtaining a first identifier of the connection cache information from the first data table if the first data table contains the connection cache information corresponding to the packet, wherein the first identifier is a first connection identifier corresponding to the connection cache information when the connection cache information is established;
obtaining connection information corresponding to the connection cache information from a second data table, and determining a second identifier of the connection cache information according to the connection information corresponding to the connection cache information, wherein the second identifier is a current connection identifier corresponding to the connection cache information and changes when the connection information changes; and forwarding the packet based on the connection cache information if the second identifier is the same as the first identifier, wherein the connection cache information corresponding to the packet comprises: a transmission path of the packet and identifiers of packet sending/receiving devices on the transmission path, and wherein the connection information corresponding to the connection cache information comprises: connection identifiers of packet sending/receiving devices corresponding to the connection cache information, or connection identifiers of users corresponding to the connection cache information.

2. The method of claim 1, further comprising:

obtaining a second connection identifier sent by a device with an updated configuration, wherein the device with the updated configuration is a packet sending/receiving device with the connection information changed; and updating the second data table with connection information corresponding to the second connection identifier sent by the device with the updated configuration.

3. The method of claim 2, further comprising:

deleting the connection cache information corresponding to the packet from the first data table if the second identifier is different from the first identifier;

obtaining a destination address of the packet and determining a transmission path for the packet according to the destination address;

using the transmission path for the packet as current connection cache information;

obtaining connection information corresponding to the current connection cache information from the second data table, and determining a third connection identifier for the current connection cache information according to the connection information corresponding to the current connection cache information;

using the third connection identifier for the current connection cache information as the first identifier of the current connection cache information, and recording the current connection cache information and the first identifier of the current connection cache information into the first data table; and forwarding the packet according to the transmission path for the packet.

4. The method of claim 3, wherein obtaining the destination address of the packet and determining the transmission path for the packet according to the destination address comprises:

performing a lookup on a MAC address table to determine path information for the packet if the destination address is in a same network segment as an address of the switch, wherein the path information comprises a forwarding address, the forwarding address being an address of a next-hop device for receiving the packet;

determining a device to be applied a security group rule according to the forwarding address in the path information, and applying the security group rule on the device; and using the device as a receiver of the packet if the security group rule is matched, so as to determine the transmission path for the packet.

5. The method of claim 3, wherein obtaining the destination address of the packet and determining the transmission path for the packet according to the destination address comprises:

performing a lookup on an access control list if the destination address is not in a same network segment as an address of the switch;

performing a lookup on a routing table and a neighbor table to determine path information for the packet when the access control list allows the packet to be forwarded, wherein the path information comprises a forwarding address, the forwarding address being an address of a next-hop device for receiving the packet;

determining a device to be applied a security group rule according to the forwarding address in the path information, and applying the security group rule on the device; and using the device as a receiver of the packet if the security group rule is matched, so as to determine the transmission path for the packet.

6. The method of claim 1, wherein obtaining the first identifier of the connection cache information from the first data table if the first data table contains the connection cache information corresponding to the packet comprises:

searching the first data table for a key corresponding to a five-tuple of the packet if the first data table contains the connection cache information corresponding to the packet, and using the key as a key of the packet;

obtaining a linked list head pointer at the key of the packet in the first data table in a form of Hash bucket; and searching in a linked list pointed to by the linked list head pointer, to obtain the connection cache information and the first identifier of the connection cache information.

7. The method of claim 1, further comprising:

obtaining a destination address of the packet if the first data table does not contain the connection cache information corresponding to the packet;

performing a lookup on a MAC address table to determine path information for the packet if the destination address is in a same network segment as an address of the switch, wherein the path information comprises a forwarding address, the forwarding address being an address of a next-hop device for receiving the packet;

determining a device to be applied a security group rule according to the forwarding address in the path information, and applying the security group rule on the device;

using the device as a receiver of the packet if the security group rule is matched, so as to determine the transmission path for the packet;

using the transmission path for the packet as current connection cache information;

obtaining connection information corresponding to the current connection cache information from the second data table, determining a fourth connection identifier for the current connection cache information, using the fourth connection identifier for the current connection cache information as the first identifier of the current connection cache information, and recording the current connection cache information and the first identifier of the current connection cache information into the first data table; and forwarding the packet according to the transmission path for the packet.

8. The method of claim 1, further comprising:
obtaining a destination address of the packet if the first data table does not contain the connection cache information corresponding to the packet;
performing a lookup on an access control list if the destination address is not in a same network segment as an address of the switch;
performing a lookup on a routing table and a neighbor table to determine path information for the packet when the access control list allows the packet to be forwarded, wherein the path information comprises a forwarding address, the forwarding address being an address of a next-hop device for receiving the packet;
determining a device to be applied a security group rule according to the forwarding address in the path information, and applying the security group rule on the device;
using the device as a receiver of the packet if the security group rule is matched, so as to determine a transmission path for the packet;
using the transmission path for the packet as current connection cache information;
obtaining connection information corresponding to the current connection cache information from the second data table, determining a fifth connection identifier for the current connection cache information, using the fifth connection identifier for the current connection cache information as the first identifier of the current connection cache information, and recording the current connection cache information and the first identifier of the current connection cache information into the first data table; and
forwarding the packet according to the transmission path for the packet.

9. An apparatus for packet forwarding, applicable to a switch, comprising:
a processor; and
a memory, configured to store instructions executable by the processor,
wherein the processor is configured to run a program corresponding to the instructions by reading the instructions stored in the memory, so as to perform operations comprising:
obtaining a packet to be forwarded;
detecting whether a first data table contains connection cache information corresponding to the packet;
obtaining a first identifier of the connection cache information from the first data table if the first data table contains the connection cache information corresponding to the packet, wherein the first identifier is a first connection identifier corresponding to the connection cache information when the connection cache information is established;
obtaining connection information corresponding to the connection cache information from a second data table, and determining a second identifier of the connection cache information according to the connection information corresponding to the connection cache information, wherein the second identifier is a current connection identifier corresponding to the connection cache information and changes when the connection information changes; and
forwarding the packet based on the connection cache information if the second identifier is the same as the first identifier,
wherein the connection cache information corresponding to the packet comprises: a transmission path of the packet and identifiers of packet sending/receiving devices on the transmission path, and
wherein the connection information corresponding to the connection cache information comprises: connection identifiers of packet sending/receiving devices corresponding to the connection cache information, or connection identifiers of users corresponding to the connection cache information.

10. The apparatus of claim 9, wherein the operations further comprise:
obtaining a second connection identifier sent by a device with an updated configuration, wherein the device with the updated configuration is a packet sending/receiving device with the connection information changed; and
updating the second data table with connection information corresponding to the second connection identifier sent by the device with the updated configuration.

11. The apparatus of claim 10, wherein the operations further comprise:
deleting the connection cache information corresponding to the packet from the first data table if the second identifier is different from the first identifier;
obtaining a destination address of the packet and determining a transmission path for the packet according to the destination address;
using the transmission path for the packet as current connection cache information, obtaining connection information corresponding to the current connection cache information from the second data table, and determining a third connection identifier for the current connection cache information according to the connection information corresponding to the current connection cache information;
using the third connection identifier for the current connection cache information as the first identifier of the current connection cache information, and recording the current connection cache information and the first identifier of the current connection cache information into the first data table; and
forwarding the packet according to the transmission path for the packet.

12. The apparatus of claim 11, wherein the operations further comprise:
performing a lookup on a MAC address table to determine path information for the packet if the destination address is in a same network segment as an address of the switch, wherein the path information comprises a forwarding address, the forwarding address being an address of a next-hop device for receiving the packet;
determining a device to be applied a security group rule according to the forwarding address in the path information, and applying the security group rule on the device; and
using the device as a receiver of the packet if the security group rule is matched, so as to determine the transmission path for the packet.

13. The apparatus of claim 11, wherein the operations further comprise:
performing a lookup on an access control list if the destination address is not in a same network segment as an address of the switch;
performing a lookup on a routing table and a neighbor table to determine path information for the packet when the access control list allows the packet to be forwarded, wherein the path information comprises a forwarding address, the forwarding address being an address of a next-hop device for receiving the packet;

determining a device to be applied a security group rule according to the forwarding address in the path information, and applying the security group rule on the device; and using the device as a receiver of the packet if the security group rule is matched, so as to determine the transmission path for the packet.

14. The apparatus of claim 9, wherein the operations further comprise:

searching the first data table for a key corresponding to a five-tuple of the packet if the first data table contains the connection cache information corresponding to the packet, and using the key as a key of the packet;

obtaining a linked list head pointer at the key of the packet in the first data table in a form of Hash bucket; and searching in a linked list pointed to by the linked list head pointer, to obtain the connection cache information and the first identifier of the connection cache information.

15. The apparatus of claim 9, wherein the operations further comprise:

obtaining a destination address of the packet if the first data table does not contain the connection cache information corresponding to the packet, wherein the destination address is an address of a destination of the packet;

performing a lookup on a MAC address table to determine path information for the packet if the destination address is in a same network segment as an address of the switch, wherein the path information comprises a forwarding address, the forwarding address being an address of a next-hop device for receiving the packet;

determining a device to be applied a security group rule according to the forwarding address in the path information, and applying the security group rule on the device;

using the device as a receiver of the packet if the security group rule is matched, so as to determine the transmission path for the packet;

using the transmission path for the packet as current connection cache information;

obtaining connection information corresponding to the current connection cache information from the second data table, determining a fourth connection identifier for the current connection cache information, using the fourth connection identifier for the current connection cache information as the first identifier of the current connection cache information, and recording the current connection cache information and the first identifier of the current connection cache information into the first data table; and forwarding the packet according to the transmission path for the packet.

16. The apparatus of claim 9, wherein the operations further comprise:

obtaining a destination address of the packet if the first data table does not contain the connection cache information corresponding to the packet, wherein the destination address is an address of a destination of the packet;

performing a lookup on an access control list if the destination address is not in a same network segment as an address of the switch;

performing a lookup on a routing table and a neighbor table to determine path information for the packet when the access control list allows the packet to be forwarded, wherein the path information comprises a forwarding address, the forwarding address being an address of a next-hop device for receiving the packet;

determining a device to be applied a security group rule according to the forwarding address in the path information, and applying the security group rule on the device;

using the device as a receiver of the packet if the security group rule is matched, so as to determine a transmission path for the packet;

using the transmission path for the packet as current connection cache information;

obtaining connection information corresponding to the current connection cache information from the second data table, determining a fifth connection identifier for the current connection cache information, using the fifth connection identifier for the current connection cache information as the first identifier of the current connection cache information, and recording the current connection cache information and the first identifier of the current connection cache information into the first data table; and forwarding the packet according to the transmission path for the packet.

* * * * *